United States Patent [19]

Hershey

[11] 3,807,742

[45] Apr. 30, 1974

[54] SECONDARY PACKING FOR A MECHANICAL SEAL

[75] Inventor: Lowell E. Hershey, Portage, Mich.

[73] Assignee: Durametallic Corporation, Kalamazoo, Mich.

[22] Filed: Aug. 3, 1972

[21] Appl. No.: 277,794

[52] U.S. Cl. .............................................. 277/87
[51] Int. Cl. ........................ F16j 15/34, F16j 15/38
[58] Field of Search ............. 277/81, 86, 87, 85, 93, 277/93 SD, 39, 40, 41

[56] References Cited
UNITED STATES PATENTS

| | | | |
|---|---|---|---|
| 3,069,176 | 12/1962 | Woodcock et al................... | 277/93 |
| 2,889,159 | 6/1959 | Jensen ................................ | 277/40 |

Primary Examiner—Louis R. Prince
Assistant Examiner—Robert I. Smith
Attorney, Agent, or Firm—Woodhams, Blanchard & Flynn

[57] ABSTRACT

Secondary packing for a mechanical seal. There are provided at least two annular packing components within the normal secondary packing receptacle in a mechanical seal, one of which sealingly engages the seal ring but only lightly touches, or is free from contact with, the shaft, the other sealingly engages the shaft but only lightly touches, or is free from engagement with, the seal ring, and the two components are in sealing engagement with each other. Preferably, the component engaging the seal ring is of a hard and stiff material, such as graphite, while the component engaging the shaft is of a softer nature, such as a fluorocarbon or rubber.

13 Claims, 3 Drawing Figures

PATENTED APR 30 1974 3,807,742

3,807,742

SECONDARY PACKING FOR A MECHANICAL SEAL

FIELD OF THE INVENTION

This invention relates to a secondary shaft packing for a mechanical seal and particularly to a type thereof having at least two cooperating components, one thereof bearing snugly and tightly against the rotating sealing member of the mechanical seal, another bearing snugly and tightly against the shaft and said two components bearing against each other in a flexible sealing relationship.

BACKGROUND OF THE INVENTION

Mechanical seals have been known to the art for over sixty years and have been of widespread application for the stuffing boxes of pumps, autoclaves, mixers or similar uses for over thirty years. While such seals have assumed a wide variety of forms, one common type which has widespread industrial use for all of such period utilizes one sealing ring which is fixed and sealed with respect to the machine being sealed and a second sealing ring operating in cooperation with said first-mentioned sealing ring, which second sealing ring encircles the shaft and rotates therewith. Means are provided for urging said second, or rotating, sealing ring against the fixed sealing ring and further means are provided, normally termed secondary packing or shaft packing, positioned between said rotating sealing member and the shaft for sealing against the passage of fluid therebetween.

This secondary packing is normally chosen according to the material being handled by the pump, or other machine in question, and according to the conditions of temperature and pressure under which the seal is expected to operate. All of this is well known to the art and the selection of such secondary packing has been a subject of extensive study from the beginning.

In many cases such secondary packing comprises O-rings which may be of natural rubber, synthetic rubber or various other materials known to the art. In such case, while seals have operated under many conditions with a high degree of success utilizing this type of secondary packing, there is often a tendency where high pressures or high temperature are encountered for the O-ring material to yield to the normal operating pressure of the system and extrude between the seal ring and the shaft and/or between the shaft and the means, often termed a compression ring, by which sealing pressure is placed onto said secondary packing and transferred therethrough to urge the rotating sealing ring against the fixed sealing ring. This problem of extrusion is well recognized and has long been known often to provide definite limitations onto the temperature or pressure which a given seal is capable of handling.

Many attempts have been made in the past to provide a secondary packing having a greater capacity for withstanding temperature and/or pressure and such packings have included ring or spiral packings of various shapes, such as of square or chevron cross-section, or other cross-sections attempting to utilize the pressure of liquid being handled to improve the sealing effect thereof.

To the same ends, such packings have also been made of a wide range of other materials. A recent and highly effective packing for this purpose comprises a plurality of graphite rings which is shown and claimed in the U.S. Pat. to Adams, No. 3,655,206, assigned to the same assignee as the present application. In utilizing graphite for sealing purposes, it has been found that the packing will withstand a very high degree of temperature and pressure and continue as an effective seal.

The seal utilizing this last-mentioned shaft packing, however, effective though it is for many purposes, still has certain disadvantages which were common also to previously known seals and which, as with previously known seals often limits the conditions under which mechanical seals so equipped may be effectively used. Among these disadvantages, one of the principle ones is the so-called "hangup" by the secondary packing as the seal otherwise attempts to move along the shaft to compensate for wear between the respectively rotating sealing faces. Under the normal pressure applied to the shaft packing, same is urged tightly against the shaft in order to create an effective seal and over the course of time this packing often tends to seize or grip onto the shaft tightly and it becomes impossible, even at a pressure within the stuffing box of only 50 p.s.i. for the packing to move axially along the shaft as necessary to compensate for wear. This problem is particularly prevalent in balanced seals and occurs occasionally in unbalanced seals. Further, in instances where material leaks through the seal and hardens on the shaft, the graphite material may respond to the normal wobble of the seal ring and wear or degrade against the hardened deposits. This can eventually destroy the seal between the packing and the shaft and permit serious leakage. Thus, the seal is in many cases effective only for a period of time less than that for which it is inherently capable of operating and provides a point at which improvement is desired.

A further problem lies in the fact that where a secondary packing has some degree of rigidity, as contrasted to the relatively soft and thereby extrudable rubber O-rings, it will tend to move slightly with respect either to the shaft or to the rotating sealing member, or both, in response to normal relative movement between the rotating sealing ring and the shaft and thereby result in fretting of either or both of the shaft or the surface of the rotating sealing ring against which the secondary packing is urged. This occurs even with stainless steel rings or shafts and provides potential areas of leakage. Further, this fretting is often erratic in that it depends in many instances upon the manner in which a seal is installed and hence one seal may operate effectively and without leakage for a relatively long period of time whereas another identical seal under identical conditions may fail as a result of fretting within a matter of a few hours.

In an attempt to meet the foregoing problems and others arising out of the secondary packing which are well known to the industry, certain of those skilled in the art have attempted to eliminate secondary packing entirely and to provide a flexible metallic bellows between the rotating sealing ring and a suitable annular member which is fixed with respect to the shaft. Such bellows structure permits the desired movement of the rotating sealing ring with respect to the shaft and yet eliminates the need for shaft packing of the kind above-described. This type of seal has been especially popular in connection with high pressures, high temperatures or highly corrosive fluids, such as but not confined to those often used in connection with nuclear equipment. However, these seals also have inherent difficulties, primarily in that the necessary flexing of the metal comprising the bellows will eventually generate minor breaking points or pinholes therethrough resulting in leakage and breakdown of the seal.

Accordingly, it has long been desirable to provide a seal capable of meeting the following objectives:

1. To provide a secondary packing for a mechanical seal which is capable of long and reliable operation under adverse conditions including one or more of high temperature, high pressure and corrosive fluid in contact with the seal parts.

2. To provide a secondary packing for a mechanical seal which will operate at a temperature and/or pressure, or in contact with a corrosive fluid, to at least the same extent and/or degree as that capable of being met by the remainder of the seal parts.

3. To provide a secondary packing for a mechanical seal which will provide effective sealing between the rotating sealing member and a shaft upon which same is mounted but will permit easy axial sliding movement thereof in order for the seal to move axially and compensate for wear.

4. To provide a secondary packing for a mechanical seal in which there is no relative movement between the seal material and adjacent metallic parts whereby to minimize or eliminate fretting of such parts and consequent failure of the seal by leakage through the irregularities in the metal parts thereby created.

5. To provide a secondary packing for a mechanical seal having a multi-part construction wherein one of said parts will tend to shield from the deposit of contaminants, or tend if such contaminants are deposited, to wipe same off from, a zone into which another portion of the seal will move as the seal compensates for wear and thereby permit such movement to take place easily and effectively.

Other objects and purposes of the invention will be apparent to persons acquainted with apparatus of this general type upon reading the following disclosure and inspection of the accompanying drawings.

SUMMARY OF THE INVENTION

In a conventional mechanical seal having an annular chamber for the reception of conventional secondary packing, there is provided according to the present invention a composite secondary packing which comprises at least two axially arranged annular packing members, one thereof being substantially rigidly associated with said rotating seal ring and the other thereof being substantially rigidly associated with the shaft. Said two packing members then bear against each other and the materials of said packing members are so chosen to be of sufficient flexibility and sealing capacity therebetween to permit normal motion of the rotating seal ring relative to the shaft without damage to such packing members or loss of sealing effect therebetween.

Means are provided for urging said members against each other while simultaneously urging one of them tightly against the seal ring but only lightly, if at all, against the shaft and urging the other thereof tightly against the shaft but only lightly, if at all, against the seal ring. Said rings may be made of any convenient material such as, as in the disclosed embodiment, laminated graphite for the packing member bearing against the rotating sealing ring and a TFE fluorocarbon for the packing member bearing against the shaft.

DETAILED DESCRIPTION

Figure 1:
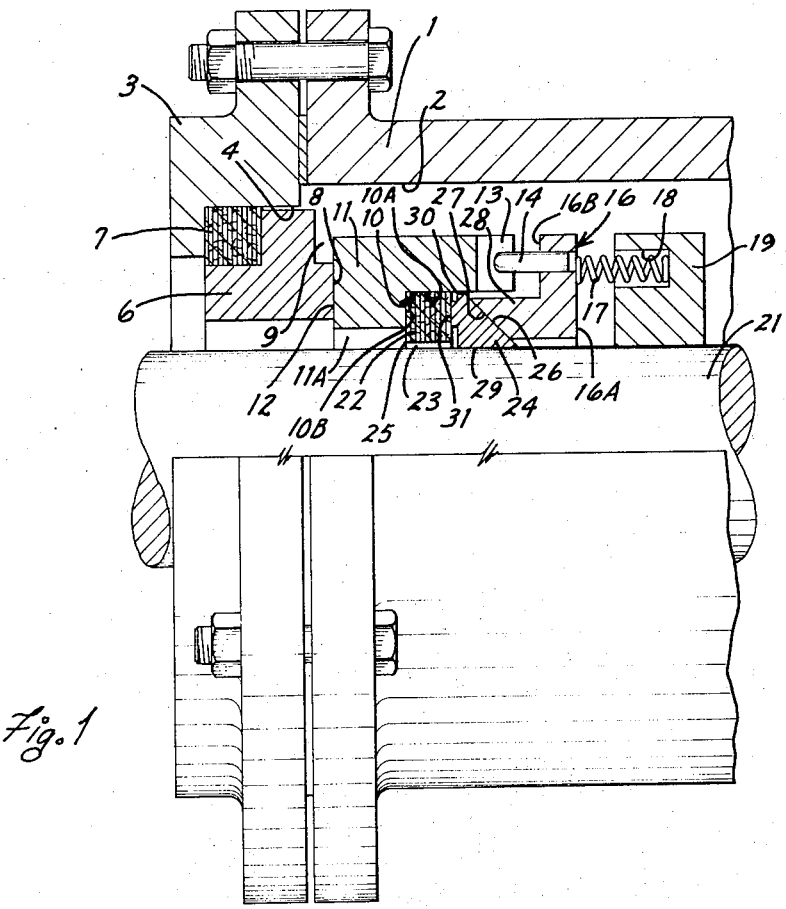
FIG. 1 of the drawing shows in one-half central section a typical seal of the type above-mentioned utilizing a secondary packing incorporating the invention.

Referring to the drawings, particularly to FIG. 1 thereof, there is shown a mechanical seal which is substantially conventional excepting for the secondary packing and the member effecting compression thereof. Said mechanical seal insofar as said invention is concerned may be of any form wherein the so-called push-type secondary packing is used and it may be utilized in any type of machinery in which such packing is needed, such as pumps or autoclaves.

Referring first to the conventional portion of the seal for convenient reference purposes there is shown a cylindrical member 1 which is here utilized to define a stuffing box 2 which, for purposes of illustration, will be assumed to project in a normal manner from the side of a rotary pump. A gland ring 3 is fixed to the outer or free end of the cylindrical housing 1 and may be fixed thereto in any convenient manner, such as by bolts or machine screws. An annular recess 4 is provided internally of the gland ring for reception of a conventional nonrotating sealing ring or insert 6 which may be affixed thereto in any convenient manner, such as by being press-fitted thereinto. A further packing 7 is often utilized between said insert and the gland ring and same may be of any desired type, such as conventional O-ring construction or laminated graphite rings as set forth in the above-mentioned U.S. Pat. No. 3,655,206. Said insert 6 has a sealing face 8 which in this embodiment is of limited radial extent to provide a chamber 9 for conventional and known purposes.

Associated with said insert 6 there is provided a conventional rotating sealing ring 11 having a sealing face 12 cooperating with the sealing face 8 of the insert and is provided with a conventional, internal, annular recess 10 coaxial therewith and extending thereinto from the rearward end thereof for reception of the secondary packing. The seal ring 11 is also provided with a plurality of circumferentially spaced, axially extending, slots 13 for the reception of driving pins 14. Said driving pins are fixed, as by press-fitting, into a compression ring 16 and urged toward the seal ring 11 by springs 17, which springs are backed by being received into suitable circumferentially spaced openings 18 in an annular clamp collar 19. The clamp collar is fixed to the shaft 21 of the machine in any convenient manner, such as by a set screw, not shown.

All of the foregoing is conventional, will be familiar to those acquainted with the art, and may be varied widely within the scope of the present invention.

Turning now to the portions of the seal assembly comprising the present invention, there is provided a first packing component 22 comprising at least one packing ring snugly received into the recess 10 and made of a relatively, stiff or rigid and pressure-resistant material. In the present illustrative embodiment, said packing component 22 is made from a plurality of thin graphite rings of the nature shown in the above-mentioned U.S. Pat. No. 3,655,206. Said component 22 will normally bear, at least as a matter of convenience, against the cylindrical surface 10A of the recess 10 but, as hereinafter set forth further, is caused to bear sealingly against the radial surface 10B thereof. Said packing component 22 also may be of such dimension that its internal diameter is a selectably variable amount greater than that of the shaft whereby the space 23 therebetween may be freely chosen according to a variety of circumstances to be served. The choosing of the magnitude of the space 23 will be dealt with further below.

Figures 2, 3:
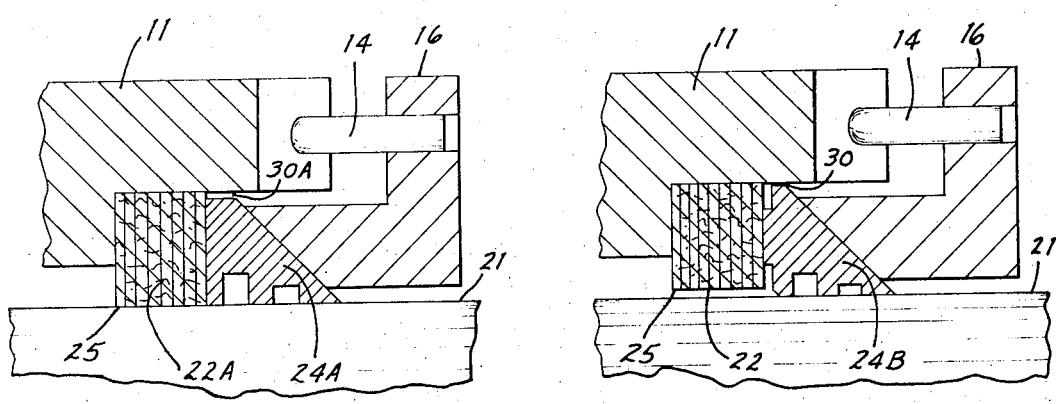
FIG. 2 shows a modification of the secondary packing shown in FIG. 1.
FIG. 3 shows a further modification of the secondary packing shown in FIG. 1.

A second annular packing component 24 comprises at least one packing ring provided axially adjacent the first packing component 22. Said component 24 is provided with a rearwardly sloping surface 26 which cooperates with a correspondingly sloping surface 27 on the forwardly projecting portions 28 of the compression member 16. The internal surface 29 of said component 24 may bear against said shaft throughout its length as shown in FIG. 1 or it may be provided with grooves and lands, (as shown at 24A in FIG. 2 or 24B in FIG. 3) in order to cause said lands to bear more tightly against the shaft than would be the case for the structure shown in FIG. 1. A projecting rib 31 is provided at the forward (here leftward) face of the second component 24 for bearing against the rearward (here rightward) face of the first component 22. For reasons which will be apparent hereinafter, the radial extent of the projection 31 is limited to a small part of the corresponding extent of the component 22 and is located roughly midway between the inner and outer surfaces thereof.

Said second component 24 is made of any material which can seal snugly to said shaft and yet slide with respect thereto and particularly which is sufficiently, flexible and resilient to effect a good sealing relationship to the material from which component 22 is made. In the particular embodiment herein utilized for illustrative purposes, the component 24 is made of TFE fluorocarbon (Teflon).

Obviously, other materials can be utilized as needed and are available for both packing components, providing only that the material of component 22 can seal snugly to the seal ring 11, the material ring 24 can seal snugly to the shaft, both materials will seal and flux with respect to each other, both components have the required mechanical strength in view of the pressures to which the seal is being subjected and both components have the necessary chemical characteristics to resist corrosion by the fluid being handled within the pump or other mechanism.

OPERATION

In considering the operation of apparatus embodying the invention, it should first be mentioned that the seal as a whole will operate in the manner already well known for conventional seals of this type. Further, the operation of the seal as a whole will be conventional regardless of whether same is an unbalanced seal as shown in the drawings or a balanced seal as is also well known to the art. It will be sufficient, therefore, to direct express attention only to the operation of the secondary packing portion thereof.

Directing attention now to the packing itself, it will be recognized that the springs 17 will in a conventional manner urge the compression ring 16 leftwardly as shown in FIG. 1. Additionally, pressure in chamber 2 is applied to the rearwardly sloping surface of the packing component 24 and creates thereon a force having both axially leftward and radially inward components. The radially inward component will compress said component 24 tightly against the shaft whereby effectively to prevent leakage between said component 24 and the shaft. The leftwardly axially directed component will urge the rib 31 strongly against the packing component 22 whereby to urge same snugly against the surface 10B of the rotating seal ring 11 and thereby prevent leakage both between the two packing components 22 and 24 and between the packing components 22 and the surface 10B. Thus, an effective seal is created between the rotating sealing ring 11 and the shaft 21. The usual seal between the surfaces 8 and 12 of the two sealing rings and between the sealing ring 9 and the gland ring 3 will complete the sealing between the internal chamber 2 of the stuffing box housing 1 and the exterior thereof.

It is, of course, known that regardless of the care with which the rotating sealing ring and the insert are made, and regardless of the care with which the parts are assembled, there will necessarily be a certain amount of wobble between the seal ring 11 and the shaft 21. However, with this shaft packing since the component 22 is pressed snugly against the surface 10B, none of such wobble will result in relative movement between said seal ring and the stiff packing component 22. Thus, there can be no fretting of the seal ring by relative movement with respect thereto of the packing component 22. Similarly, the force of the compression ring 16 as above pointed out clamps the packing component 24 tightly against the shaft 21 and hence there can be no relative movement between said last-named packing component and the shaft and therefore no fretting created on the shaft by the packing component 24. The relative movement, therefore, is taken up between the rib 31 and the surface of the packing component 22 immediately adjacent thereto. However, inasmuch as these surfaces are somewhat resilient and are both sealing surfaces, such relative movement will not destroy the seal therebetween nor will it damage the mutually contacting surfaces. Therefore, the seal between the rotating seal ring 11 and the shaft 21 is and remains effective and whatever wobble may exist between said seal ring 11 and said shaft is effectively absorbed without damage to any of the metal parts or to the packing.

It being obviously desirable to hold the seal ring 11 centered with respect to the axis of the shaft 21, same can be accomplished by so dimensioning radially either or both of the two packing rings so that either or both of them substantially fill the space between the internal surface 10A of the rotating seal ring and the surface of the shaft 21 but without exerting any appreciable pressure on either thereof. Thus, the packing ring 22 may be of such internal and external diameter that it just touches both the surface 10A and the surface of the shaft 21 (as at 22A in FIG. 2) without exerting appreciable pressure on either thereof and this will adequately support and center the seal ring 11. Similarly, either additionally or alternatively, both the outer diameter and inner diameter of the packing component 24 may be made such that when the packing ring 24 is pressed tightly against the shaft 21, and the parts are at operating temperature, the outermost cylindrical surface 30 (FIGS. 1 and 3) thereof will just touch without pressing appreciably against the surface 10A of the seal ring 11 or may be slightly spaced therefrom as at 30A in FIG. 2. Thus, where so touching this ring too can function to assist in holding the seal ring properly centered with respect to the shaft, but without any attempt to impose a sealing relationship between said packing component 24 and the surface 10A of the seal ring. A typical, but nonlimiting, dimensional difference between the radius of the surface 10A and the radius of the outermost cylindrical surface of the packing component 24 will be 0.005 inch.

Returning now to the clearance at 23, same may vary from zero to approximately 0.010 inch, the larger dimension being useable where the packing component 24, or some penetration of the rib 31 into the packing ring 22, or both of them, is relied upon to center the seal ring 11 or where the rate of rotation of the shaft and seal ring is sufficiently low that a slight off-centering of the seal ring is of no consequence. However, where the space 23 is of minimal radial extent (FIG. 2), such that the inner surface of the packing component 22 is in light contact with, but under no measurable pressure against, the surface 21, then there is obtained the additional advantage that in cases where a condensible or depositable material leaking between the seal faces 8 and 12 is deposited on the shaft 21, the packing component 22, being relatively stiff, will act as a wiper along the shaft as same moves leftwardly in response to wear between the relatively moving parts and thereby permit an easy sliding movement leftwardly of the packing component 24 along the shaft in response to pressures applied as above-described to the compression ring 16. This minimizes or eliminates the "hang-up" which often otherwise occurs, principally with balanced seals, when the portion of the secondary packing sealing against the shaft is required to slide therealong and similtaneously push away materials which have deposited on the shaft immediately in front of said packing. In some cases where such materials harden on the shaft and cannot be wiped or pushed away, the normal wobble of the seal ring 11 will cause the lower forward (leftward) corner 25 of the component 22 (or 22A) to bear against, and wear or degrade against, such hardened deposits. In this case, however, in contrast to where the graphite packing is the sole packing, such degrading of the radially inner edge 25 does not destroy the seal but instead often merely permits the components 22, 22A, to move leftwardly and follow the wear of the seal ring 11.

It has been observed that in certain cases where a packing made in the manner of the above-mentioned U.S. Pat. No. 3,655,206 and utilizing laminated graphite only (as if the packing 22 were urged into sealing relationship with both the surface 10B and the shaft) will cause fretting of even a stainless steel shaft in two days of operation, the packing of the present invention has been caused to operate under identical conditions for test periods involving many days without any visually discernible damage to the metal surfaces at all. Since the rib 31 will tend to penetrate into the packing 22, or if the rib 31 is not used, the leftward surface of the packing 24 may lie fully against the rightward surface of the packing 22, there may be some tendency, where the space 23 is in any amount above zero, for the forward innermost corner of the packing 22 to extrude leftwardly into the space 23. Thus, where it is desired for operational or assembly convenience that such space be greater than zero, its magnitude will be limited by the tendency of the packing component 24 to extrude into said space which in turn will be a function of the material from which said component 24 is made and the pressure to which it is subjected. As above mentioned in the case where said component 24 is made of TFE fluorocarbon, and pressures of 750 p.s.i. may be applied within the chamber 2, the space 23 has been made as large as 0.010 inch without any noticeable extrusion thereinto by the ring 24. Similarly, as is frequently the case, where the relatively rigid component 22 is made of laminated graphite, the space 11A between the seal ring 11 and the shaft may be as much as one-sixteenth inch.

It should be noted, however, that TFE fluorocarbon or similar materials tend to expand on heating. Accordingly, the outside diameter of the packing component 24 must be selected with such expansion in mind so that even when so expanded it will do more than barely touch the surface 10A and will definitely not seize same or press with any great degree of force thereagainst.

While the angle between the sloped faces 26 and 27 and the axis of the shaft is in this embodiment shown as approximately 45°, same may vary somewhat in either direction, according to the material of which the shaft packing 24 is made and the pressure to which same is subjected. However, the limits for fluorocarbon types of material appear to be between approximately 60° and approximately 30° inasmuch as the 30° angle seals effectively but grips the shaft so strongly that axial movement therealong is difficult and a 60° angle in some cases does not grip the shaft with sufficient force to effect a reliable sealing.

It will also be recognized that with the invention herein shown there are utilized two separate packing components, either of which would have some degree of packing effectiveness if used alone. Thus, an added degree of safety is provided against catastrophic seal breakdowns for even if one packing component fails, the other will at least inhibit leakage until the failure can come to the attention of maintenance personnel and equipment shut down for repair. This is obviously a great advantage in handling dangerous fluids, such as highly corrosive fluids or radioactive fluids.

Inasmuch as a relatively rigid material can be chosen, and in the illustrated embodiment is chosen, for the packing component 22, same can provide a high level of support for the usually softer packing component 24 and thereby enable the secondary packing as a unit to withstand much higher pressures than present conventional secondary packings can normally handle. Thus, since the remainder of the seal is adequately strong to handle relatively high pressures, seals equipped with a secondary packing of the invention are able to handle much higher pressures than under previous practice. The maximum pressure attainable has not yet been ascertained but it is at least 750 p.s.i. for seals of conventional unbalanced design as shown in the drawings and adapted to frequently utilized shaft sizes, such as shafts of 1 to 4 inches in diameter.

Contrastingly, while it is preferably for obtaining the full benefits of the invention as above-described to make the component 22 of a hard and stiff material and the component 24 of a softer, more conformable, material, other arrangements are possible within the scope of the invention and one of its advantages is the opportunity so afforded to choose materials as appropriate. For example, in a relatively low pressure operation, both packing components can be made of a fluorocarbon or of a rubber (though still perferably of different degrees of rigidity), which arrangement will still be an effective seal and will still minimize fretting.

While certain specific embodiments of the invention have been chosen to illustrate same, it will be recognized by those skilled in the art that the principles herein set forth are applicable in a widely varying arrangement of parts and with a wide range of specific packing materials. Accordingly, such variations will be included within the scope of the hereinafter appended claims excepting as said claims by their express terms require otherwise.

The embodiments of the invention in which an exclusive property or privilege is claimed are defined as follows:

What is claimed is:

1. In a mechanical seal assembly operatively positioned between a stuffing box housing and a shaft relatively rotatable with respect thereto, said assembly including a seal ring rotatable with said shaft and bearing sealingly against a nonrotating sealing ring fixed with respect to said stuffing box housing whereby the plane of said seal ring tends during normal operation to move angularly with respect to the axis of said shaft, the combination comprising:
 a first ringlike annular packing component encircling said shaft and having a first face thereon bearing sealingly against said seal ring, said first packing component being free from a bearing relationship with respect to said shaft;
 a second ringlike annular packing component encircling said shaft and being sealingly engaged with said shaft and axially slidable with respect thereto, said second packing component having a first surface thereon bearing sealingly against a second face of said first packing component, said second packing component also having a second surface which is of a conical configuration;
 mechanical means urging said second packing component sealing against said shaft and against said first packing component;
 said mechanical means including a compression ring surrounding said shaft and having a conical face in engaging relationship with the second surface of said second packing component, whereby axially directed pressure applied to said compression ring imposes a force onto said second packing component which has both a radially inwardly directed component and an axially directed component.

2. A mechanical seal assembly according to claim 1, wherein said seal ring has a cylindrical surface encircling both of said annular packing components and wherein said second packing component is dimensioned at its outer surface so that at its operating temperature it will not exert any appreciable pressure against the surrounding cylindrical surface of the seal ring.

3. A seal assembly according to claim 1, wherein said first surface has an annular rib arranged thereon for bearing against said second face whereby to concentrate and intensify the sealing force existing between said first and second packing components, said annular rib having a radial width less than the radial width of said first packing component so that said annular rib sealingly bears against said first packing component at a location spaced inwardly and outwardly from the inner and outer peripheries, respectively, of said first packing component.

4. A seal assembly according to claim 1, wherein said first packing component is comprised of a lamination of graphite disks.

5. A seal assembly according to claim 1, wherein the first face of said first packing component is disposed within a plane which extends substantially radially relative to the axis of said shaft, said first face being disposed in sealing engagement with a bearing surface formed on said seal ring with said bearing surface also lying within a plane which extends substantially radially relative to the axis of said shaft;
 the second face of said first packing component and the first surface of said second packing component each lying in planes which extend substantially radially relative to the axis of said shaft; and
 the second surface of said second packing component being disposed on the side of said second packing component which is opposite said first surface, said second surface diverging conically outwardly relative to the axis of said shaft in a direction toward said first packing component, said second packing component also having an inner annular surface which is urged into sealing engagement with the periphery of said shaft due to the radial inward compression of said second packing component by said compression ring.

6. A seal assembly according to claim 1, wherein the second packing component comprises a fluorocarbon material.

7. A seal assembly according to claim 1, wherein said first packing component is of a relatively rigid material, and wherein said second packing component is of a relatively flexible material.

8. A seal assembly according to claim 1, wherein said first packing component has an inner peripheral surface which is spaced from the surface of said shaft to prevent said first packing component from fretting or damaging the shaft.

9. A seal assembly for use with a shaft, said seal assembly including a sealing ring rotatable with and loosely encircling said shaft, said sealing ring being mounted to permit limited tilting thereof relative to said shaft, packing means coacting between said sealing ring and said shaft for creating a fluid tight seal therebetween, and mechanical means for urging said packing means sealingly against said shaft and against said sealing ring, said mechanical means including a compression ring encircling said shaft for axially compressing said packing means between said sealing ring and said compression ring, and means nonrotatably coupling said sealing ring and said compression ring while enabling relative axial movement therebetween, comprising the improvement wherein:
 said packing means includes first and second packing rings encircling said shaft and positioned axially adjacent one another, said first packing ring being of substantially rectangular cross-section and having one end face thereof maintained in sealing engagement with one of said sealing and compression rings, the other end face of said first packing ring being maintained in bearing and sealing engagement with an adjacent face of said second packing ring, said second packing ring also having a conical bearing surface thereon maintained in sealing and bearing engagement with an adjacent conical face formed on the other of said sealing and compression rings.

10. A seal assembly according to claim 9, wherein both of said first and second packing rings are constructed of a non-metallic material, one of said packing rings being relatively flexible and the other packing ring being relatively rigid.

11. A seal assembly according to claim 9, wherein one of said packing rings is of a laminated construction.

12. A seal assembly according to claim 11, wherein said first packing ring is constructed of graphite and is positioned so that the inner peripheral surface thereof does not exert any appreciable pressure on the surface of said shaft.

13. A seal assembly according to claim 12, wherein said second packing ring has an annular rib arranged on the face thereof which is disposed in sealing engagement with the adjacent face of said first packing ring, said annular rib having a radial width less than the radial width of the adjacent face of said first packing ring.

* * * * *